United States Patent [19]
Moriyama

[11] Patent Number: 5,652,424
[45] Date of Patent: Jul. 29, 1997

[54] FOCUS STATE DETECTION DEVICE AND METHOD

[75] Inventor: Keiji Moriyama, Kanagawa-ken, Japan

[73] Assignee: Nikon Corporation, Tokyo, Japan

[21] Appl. No.: 493,391

[22] Filed: Jun. 21, 1995

[30] Foreign Application Priority Data

Jun. 23, 1994 [JP] Japan .................................. 6-141322

[51] Int. Cl.$^6$ .............................. G01J 1/20; G03B 13/36
[52] U.S. Cl. ....................... 250/201.4; 250/204; 396/111
[58] Field of Search ............................. 250/201.4, 204; 396/111, 133

[56] References Cited

U.S. PATENT DOCUMENTS

| | | | |
|---|---|---|---|
| 4,857,718 | 8/1989 | Karasaki et al. | 250/204 |
| 4,859,842 | 8/1989 | Suda et al. | 396/111 |
| 5,530,513 | 6/1996 | Ohsawa | 396/111 |

*Primary Examiner*—Stephone Allen
*Attorney, Agent, or Firm*—Oliff & Berridge

[57] ABSTRACT

A focus state detection device includes a field mask aperture having a shape created from the overlapping portions of two areas. The first area is formed by the outermost perimeter of the cross-section of light rays passing through the field mask plane toward each of the arrays of photoelectric conversion devices from each of point of the conjugal images of the arrays of photoelectric conversion devices at the primary imaging plane. The second area is formed by line segments that are the projection onto the field mask plane of the boundary lines at the surface of each re-imaging lens on the side toward the arrays of photoelectric conversion devices. The use of this shape causes light to be directed within the boundary lines of the outer perimeter of each of the re-imaging lenses. Through the use of this shape, the creation of stray light and internal reflection in the focus state detection optical system are suppressed, and stable focus state detection precision is enabled.

34 Claims, 15 Drawing Sheets

FOCUS STATE DETECTION DEVICE AND METHOD

BACKGROUND OF THE INVENTION

1. Field of the Invention

The present invention relates to a focus state detection device used in a camera. More specifically, the present invention relates to a compact focus state detection device that minimizes internal reflection.

2. Background of the Related Art

The basic configuration of a conventional focus state detection optical system using a TTL (through-the-lens) phase difference detection method for use in a camera or the like is shown in FIG. 19. The focus state detection optical system of this focus state detection device consists of an exit pupil 1000c of a shooting lens 1000, a field mask 2000, a condenser lens 3000, a diaphragm mask 4000, a re-imaging lens 5000 and a photoelectric conversion device 6000. All of the components are on the optical axis O of shooting lens 1000.

Light rays that pass through the two regions 1000a and 1000b of the exit pupil 1000c are composed by shooting lens 1000 into a primary image of the subject near field mask 2000. Restriction of the light rays is performed by field mask 2000 so that light rays from the subject to condenser lens 3000 are restricted. Light rays that pass through condenser lens 3000 pass through apertures 4000a and 4000b of diaphragm mask 4000, which similarly restricts unnecessary light rays. The light rays are re-composed as secondary images on photoelectric conversion device array 6000 by the pair of lens components 5000a and 5000b of re-imaging lens 5000.

In a conventional focus state detection device, the focus adjustment condition of shooting lens 1000 is detected by using a re-imaging system, which is composed of condenser lens 3000, diaphragm mask 4000 and re-imaging lens 5000, so that a pair of secondary images, substantially similar to the primary image formed by shooting lens 1000, is formed on photoelectric conversion device arrays 6000a and 6000b. The relative positional relationship of the pair of secondary images changes in accordance with the focus adjustment condition of shooting lens 1000.

Japanese Laid-Open Patent Application Sho 62-95511 discloses a focus state detection device wherein at least two focus state detection optical systems based on this fundamental principle are provided. The focus state detection areas of the optical systems are positioned so as to intersect at a single point on the photographic field. The focus state detection device is equipped with a plurality of focus state detection optical systems that are positioned on the optical axis of the shooting lens. The systems differ in the positioning of the focus state detection areas, the formation of the re-imaging lens, and the apertures of the field mask.

When two focus state detection areas are perpendicular on the optical axis, the shape of the apertures of the field mask is formed into a cross shape corresponding to each focus state detection area. Alternatively, the apertures are formed into the shape of a square such that the diagonals coincide with the vertical and horizontal directions of the photographic field. When three focus state detection areas intersect on the optical axis, the shape of the apertures is formed into a hexagon. By using the above-described shapes, the images of each of the field mask apertures are formed on the photoelectric conversion device such that no positional interference occurs on adjacent photoelectric conversion device arrays.

However, in the conventionally known focus state detection device as described above, with the above-described square and hexagonal shapes of the field mask apertures, internal reflection is produced within the focus state detection device when a large amount of light, unrelated to focus state detection, enters the device. Only related light, which is light that passes through the polygons near their diagonals, is desired within the device.

More problems arise when a plurality of focus state detection areas exists both on and off of the optical axis of the shooting lens in the photographic field. Light rays that are incident from the aperture of a field mask for a particular focus state detection optical system can enter a different focus state detection optical system in the photographic field. Light that enters a different focus state detection optical system in this way is called stray light, and accurate focus state detection is impossible when stray light is produced.

FIGS. 15 to 18 illustrate the mechanism whereby stray light is produced. In these drawings, the arrangement of the optical system is the same as in FIG. 19.

FIG. 15 is a drawing showing a field mask 20. A cross-shaped aperture 20c is provided in field mask 20. Within aperture 20c, the rectangular area with the longer side extending in the horizontal direction is designated 20a, while the rectangular area with the longer side extending in the vertical direction is designated 20b. These areas correspond respectively to a focus state detection area in the horizontal direction and a focus state detection area in the vertical direction.

FIG. 16 shows the state of diaphragm mask 40. Diaphragm mask 40 has aperture stops 40a, 40b, 40c and 40d.

Light rays that pass through points 20p, 20q, 20r and 20s on field mask aperture 20c shown in FIG. 15 pass through aperture stops 40a, 40b, 40c and 40d of diaphragm mask 40 to reach re-imaging lens 50a. The state of re-imaging lens 50a at this time is shown in FIG. 17. FIG. 17 shows a portion of re-imaging lens 50, which has four regions. Re-imaging lens 50 is composed of four lens components 50a, 50b, 50c and 50d formed integrally as a single unit, and these components are divided from each other by boundaries 50m and 50n.

Reference numeral 51 designates the locus formed on re-imaging lens 50a by a light ray that passes through an arbitrary point of field mask aperture 20c and passes through the middle of aperture stop 40a. In actuality, light rays also exist that pass through all other portions. In other words, all of the points on locus 51 have a spread corresponding to aperture stop 40a, and the locus on re-imaging lens 50a of light rays that pass through all of aperture stop 40a is the outermost perimeter 52 when the image of aperture stop 40a is caused to move along the perimeter of 51. Light rays within the region surrounded by outermost perimeter 52 are all light rays that should pass through lens component 50a.

The above-described light rays that pass through points 20p, 20q, 20r and 20s on field mask aperture 20c become regions 51p, 51q, 51r and 51s respectively on re-imaging lens 50a. As shown in FIG. 17, regions 51p and 51r are entirely inside boundary lines 50m and 50n of the lens component and are included within lens component 50a. However, portions of regions 51q and 51s cross over boundary lines 50m and 50n and enter lens component 50c.

As a result of the light rays crossing over boundary lines, the range of light rays reaching the surface of the photoelectric conversion device arrays shown in FIG. 18 is divided into region 61, where light rays that pass through lens component 50a arrive, and regions where light rays arrive after crossing over lens boundary lines 50m and 50n and passing through lens components 50c and 50d. When this occurs, the portions of regions 51q and 51s in FIG. 17 that cross over lens boundary line 50m arrive at the positions of regions 61q and 61s in FIG. 18, and in particular, region 61s clearly falls as harmful stray light on photoelectric conversion device array 60c of an adjacent optical system.

This is a problem that arises when the size of the image of the field mask aperture projected onto each lens component on the side of the re-imaging lens toward the photoelectric conversion device array becomes excessively large. Because the size of the image of the aperture becomes excessively large, a portion of the focus state detection light rays that should reach the photoelectric conversion device array of one focus state detection optical system crosses over the boundary lines between re-imaging lens components and passes through a re-imaging lens component other than the re-imaging lens component that the portion of the light rays originally should have passed through. The light rays reach another photoelectric conversion device array, causing a striking deterioration of focus state detection precision and making focus state detection impossible.

In order to prevent this kind of stray light, focus state detection devices such as those described in Japanese Laid-Open patent applications Sho 63-284514 and Sho 63-289513 have been proposed. The proposed focus state detection devices have focus state detection optical systems positioned so that a plurality of focus state detection areas exists in the photographic field. The devices are equipped with light-blocking masks that block stray light on the optical path of a focus state detection optical system.

In order to position a focus state detection device in the limited space inside a camera body, it is necessary to use a configuration wherein the light path of the focus state detection optical systems is bent using reflecting members such as mirrors or the like, thereby limiting the possible positioning of light-blocking masks. Consequently, when a plurality of focus state detection areas in the photographic field is closely adjacent each other, it becomes impossible to obtain adequate effects from blocking stray light that is produced when large quantities of unrelated light enter the area. Because this stray light and its internal reflection become noise in the secondary image information from the photoelectric conversion device arrays, focus state detection either becomes impossible or its precision deteriorates.

In addition, because a camera body has no extra space, the field mask must be positioned at a place separated from the image of the shooting lens. Furthermore, when a shape corresponding to each focus state detection area (e.g., a cross-shaped field mask when two focus state detection areas are orthogonal on the optical axis) is used as the shape of the apertures of the field mask when the positions of the field mask and the image of the shooting lens are separated, a portion of the focus state detection light rays that originally related to a particular focus state detection optical system reaches the photoelectric conversion device array of the other intersecting focus state detection optical system. This creates the above-described stray light.

In addition, even when the attempt is made to make at least one of the focus state detection areas longer, a similar problem arises.

SUMMARY OF THE INVENTION

In consideration of the foregoing difficulties in conventional devices, it is an object of the present invention to suppress internal reflection and the creation of stray light by modifying the shape of the apertures of the field mask in a focus state detection device having at least two focus state detection areas that have mutually different directions and intersect. In addition, it is an object of the present invention to provide a focus state detection device that has sufficient focus state detection area length and maintains stable focus state detection precision without sacrificing space inside the camera body.

In order to achieve the above and other objects, the focus state detection device of the present invention is a focus state detection device having at least two focus state detection areas positioned on the photographic field so as to mutually intersect. A shooting lens composes a subject image on a primary imaging plane. A field mask having apertures that restrict light rays to each of the focus state detection areas is positioned near this primary imaging plane. A re-imaging optical system re-composes light rays that have passed through the field mask onto two pairs of arrays of photoelectric conversion devices. Before reaching the photoelectric conversion devices, the light passes through two pairs of stops and two pairs of re-imaging lenses corresponding to the stops. The re-imaging lenses preferably include no fewer than four lenses formed integrally. The shape of the apertures of the field mask is defined by the overlap of two areas. The first area is the area enclosed by an outermost perimeter of the cross-section of light rays passing through the field mask plane toward each of the pair of arrays of photoelectric conversion devices from each point of the conjugal images of the arrays of photoelectric conversion devices at the primary imaging plane. The second area is that bounded by line segments representing the projection onto the field mask plane of the boundary line at the surface of each re-imaging lens on the side toward the arrays of photoelectric conversion devices. The shape is found within the outer boundary lines around the outer perimeter of each of the re-imaging lenses.

In a further embodiment, the invention includes two focus state detection areas that are mutually orthogonal.

In another embodiment, the invention includes a focus state detection device having two focus state detection areas intersecting on the optical axis of the shooting lens.

In a further embodiment, the invention includes a focus state detection device having two focus state detection areas that intersect off of the optical axis of the shooting lens.

In yet another embodiment, the invention comprises a focus state detection device that has a plurality of combinations of two intersecting focus state detection areas, with the combinations positioned on and off of the optical axis of the shooting lens.

With the present invention, a focus state detection device is obtained that suppresses the creation of stray light and internal reflection in the focus state detection optical system and that has stable focus state detection precision.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Hereinafter, descriptions are provided of the preferred embodiments of the present invention that eliminate stray light produced as described above and enable accurate focus state detection.

FIGS. 1 to 5 are drawings showing a first embodiment of the present invention.

Figure 1:
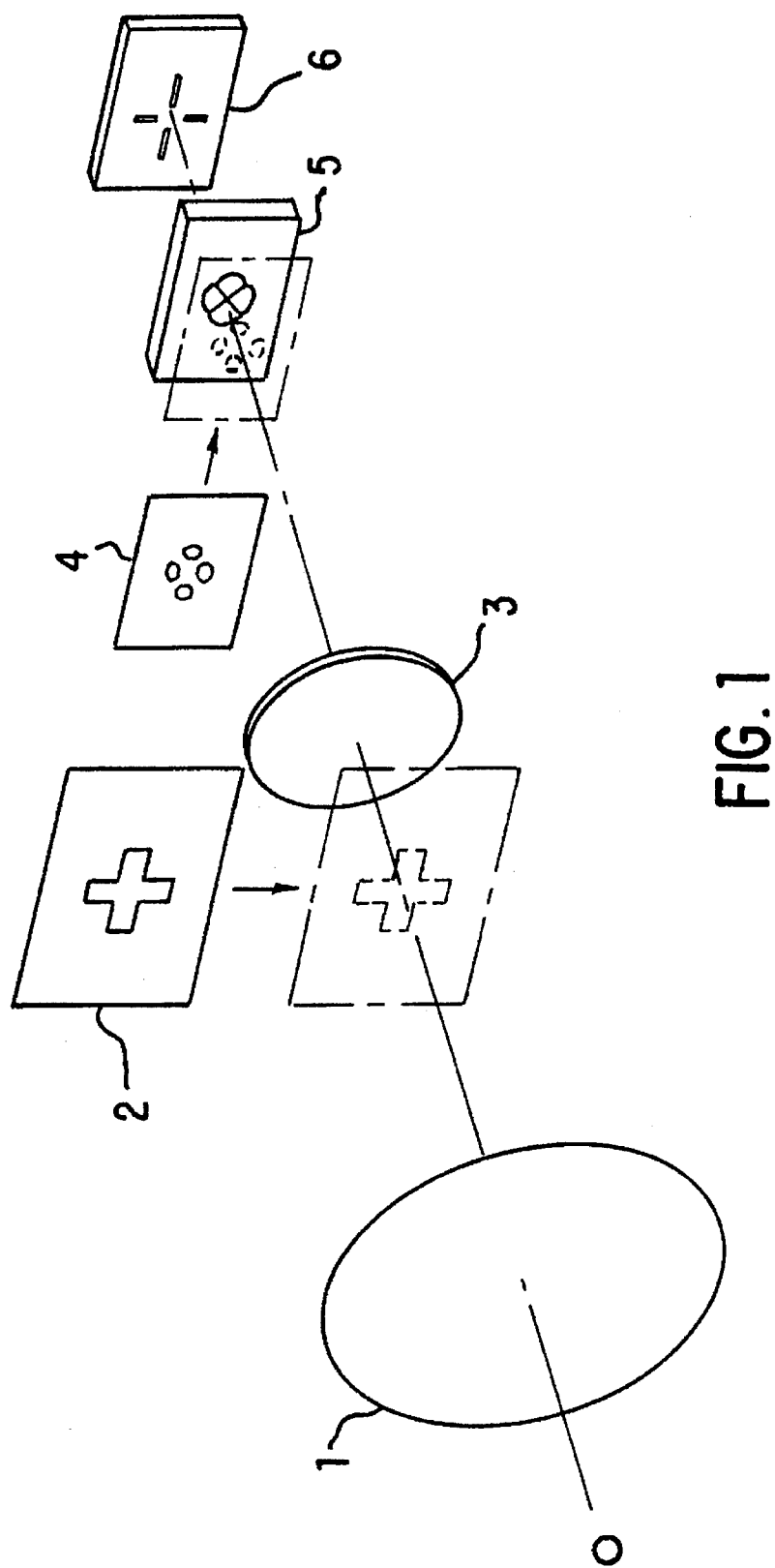
FIG. 1 is a drawing showing the entirety of the optical system in a focus state detection device according to a first embodiment of the present invention.

FIG. 1 is a drawing showing the entirety of the optical system in a focus state detection device of the first embodiment. The optical system of this focus state detection device has a field mask 2, a condenser lens 3, a diaphragm mask 4, a re-imaging lens 5 and a photoelectric conversion device 6 arranged in order on an optical axis O of a shooting lens 1.

Figure 4:
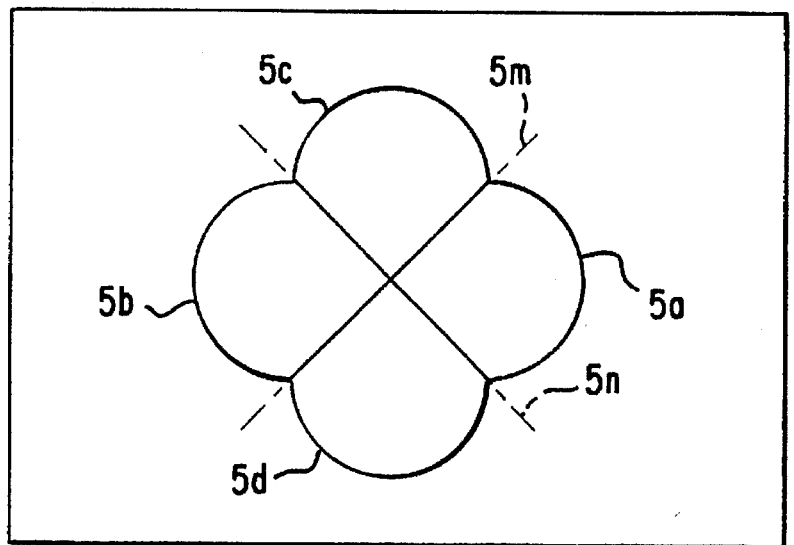
FIG. 4 is a drawing showing the re-imaging lens in a focus state detection device according to a first embodiment of the present invention.
Figure 5:
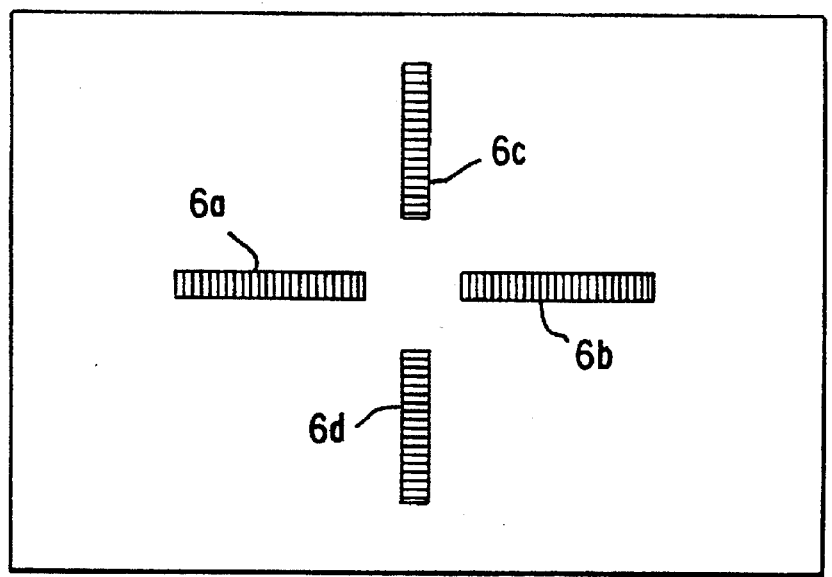
FIG. 5 is a drawing showing the photoelectric conversion device in a focus state detection device according to a first embodiment of the present invention.

As shown in FIG. 5, the focus state detection device of the first embodiment has photoelectric conversion devices 6a and 6b in the horizontal direction of the photographic field and photoelectric conversion devices 6c and 6d in the vertical direction. Light rays that pass through field mask 2 shown in FIG. 2 and through portions 4a, 4b, 4c and 4d of diaphragm mask 4 shown in FIG. 3 subsequently pass through re-imaging lens 5. The light rays pass through the re-imaging lens, in which four lens components 5a, 5b, 5c and 5d are integrally formed as a single unit as shown in FIG. 4. The light rays are re-composed on elements 6a, 6b, 6c and 6d, respectively, of photoelectric conversion device 6 shown in FIG. 5.

The shape of field mask 2 will now be described in detail with reference to FIG. 2.

Field mask aperture 2g has a shape bounded by area surrounded by a rectangular area 2e with the longer side extending in the horizontal direction and a rectangular area 2f with the longer side extending in the vertical direction. The rectangular areas correspond respectively to a focus state detection area in the horizontal direction and a focus state detection area in the vertical direction. Line segments 2a, 2b, 2c and 2d further define the shape of the aperture and correspond to boundary lines 5m and 5n of re-imaging lens 5 shown in FIG. 4. The intersection of the boundary lines and the horizontal and vertical extensions creates the final shape of field mask aperture 2g.

Figure 3:
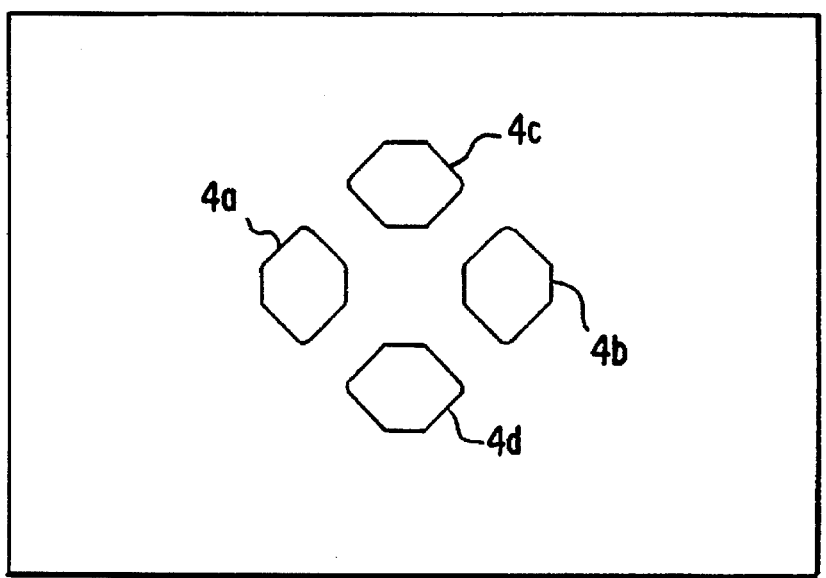
FIG. 3 is a drawing showing the diaphragm mask in a focus state detection device according to a first embodiment of the present invention.
Figure 6:
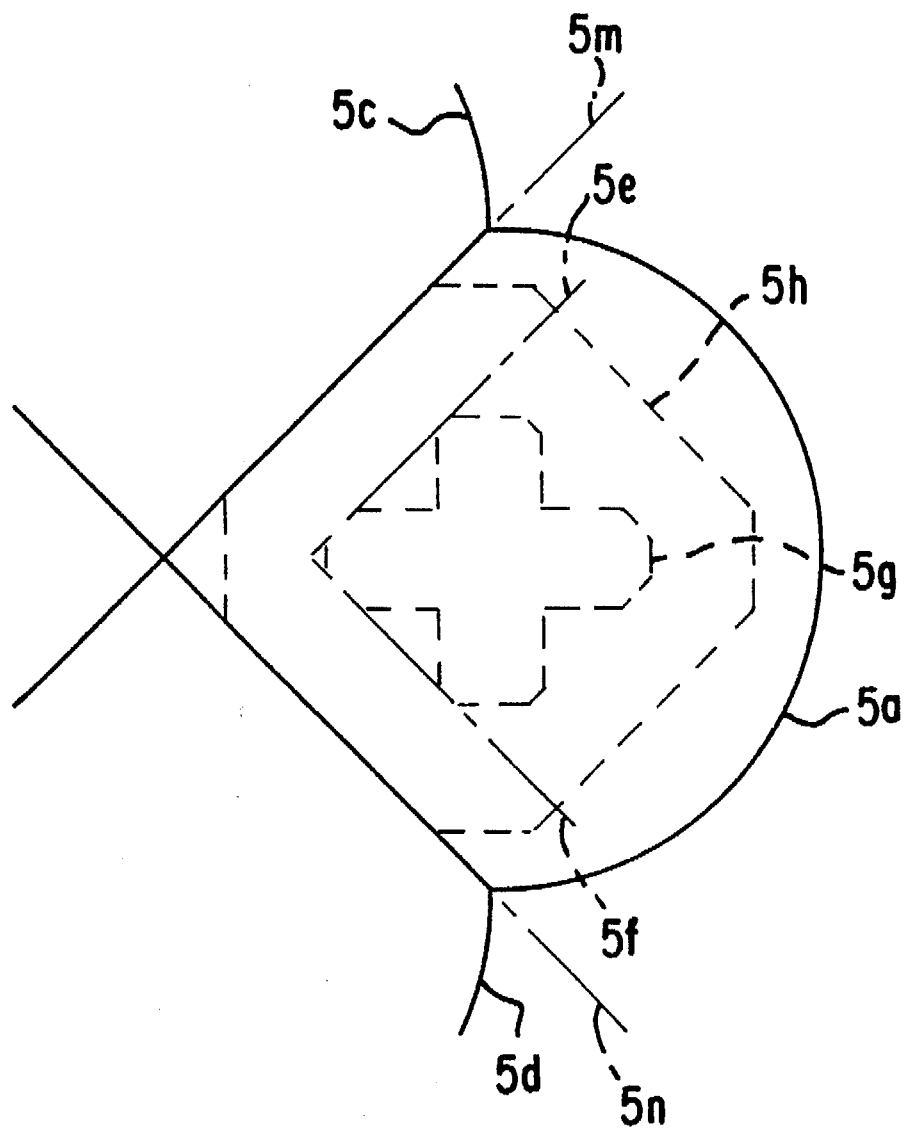
FIG. 6 is a drawing showing the state of photography light rays that reach the re-imaging lens in a focus state detection device according to a first embodiment of the present invention.

FIG. 6 shows the locus 5g when a light ray passes through an arbitrary point on field mask aperture 2g and through the middle of aperture stop 4a shown in FIG. 3 and reaches re-imaging lens 5a shown in FIG. 4.

In this instance, the entirety of locus 5g is within 5e and 5f and bounded by re-imaging lens component boundary lines 5m and 5n. The entire range 5h of light rays that pass through aperture stop 4a reach the lens component of re-imaging lens 5a on the side toward the photoelectric conversion device within these boundaries. The light rays are thus prevented from crossing over lens component boundary lines 5m and 5n, thereby eliminating light rays that enter adjacent lens components 5c and 5d.

Figure 2:
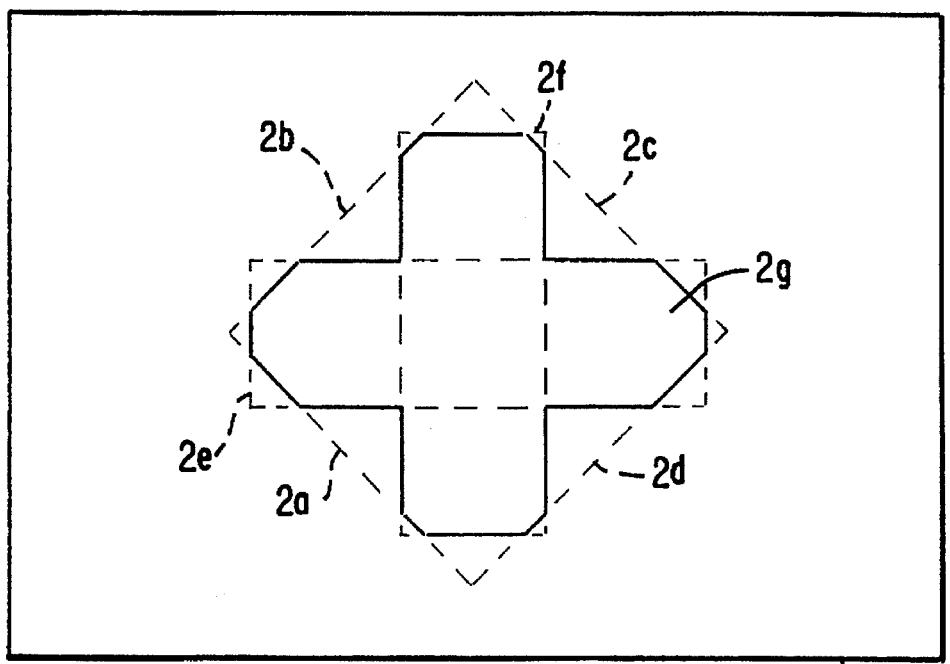
FIG. 2 is a drawing showing the field mask in a focus state detection device according to a first embodiment of the present invention.

When 5e and 5f in FIG. 6 are projected to the field mask plane, they correspond respectively to 2a and 2b in FIG. 2.

By shaping the aperture of the field mask within a area surrounded by line segments corresponding to each of the boundary lines of the integrally formed re-imaging lens on the side toward the photoelectric conversion device arrays, crossing of the projected image of the field mask aperture over the boundary lines of the re-imaging lens on the side toward the photoelectric conversion device arrays is eliminated. It becomes possible to prevent a portion of the focus state detection light rays relating to a focus state detection optical system from reaching another mutually intersecting photoelectric conversion device array.

The field mask aperture is shaped substantially the same as the rectangular area corresponding to the reverse projected image of the photoelectric conversion device arrays onto the field mask. This shape also corresponds to the outermost perimeter of the cross-section of light rays from each point in the conjugal image of the photoelectric conversion device arrays on the primary imaging plane moving toward the pair of photoelectric conversion device arrays, respectively. By the use of this shape, the entering of light unrelated to focus state detection is suppressed. Internal reflection within the focus state detection device and the creation of stray light between focus state detecting optical systems positioned at different places become extremely small. In addition, by also using the light-blocking mask, which is positioned at a restricted place within the device, it becomes possible to more effectively block internal reflection and stray light.

FIGS. 7 to 10 are drawings showing a second embodiment of the present invention.

Figure 7:
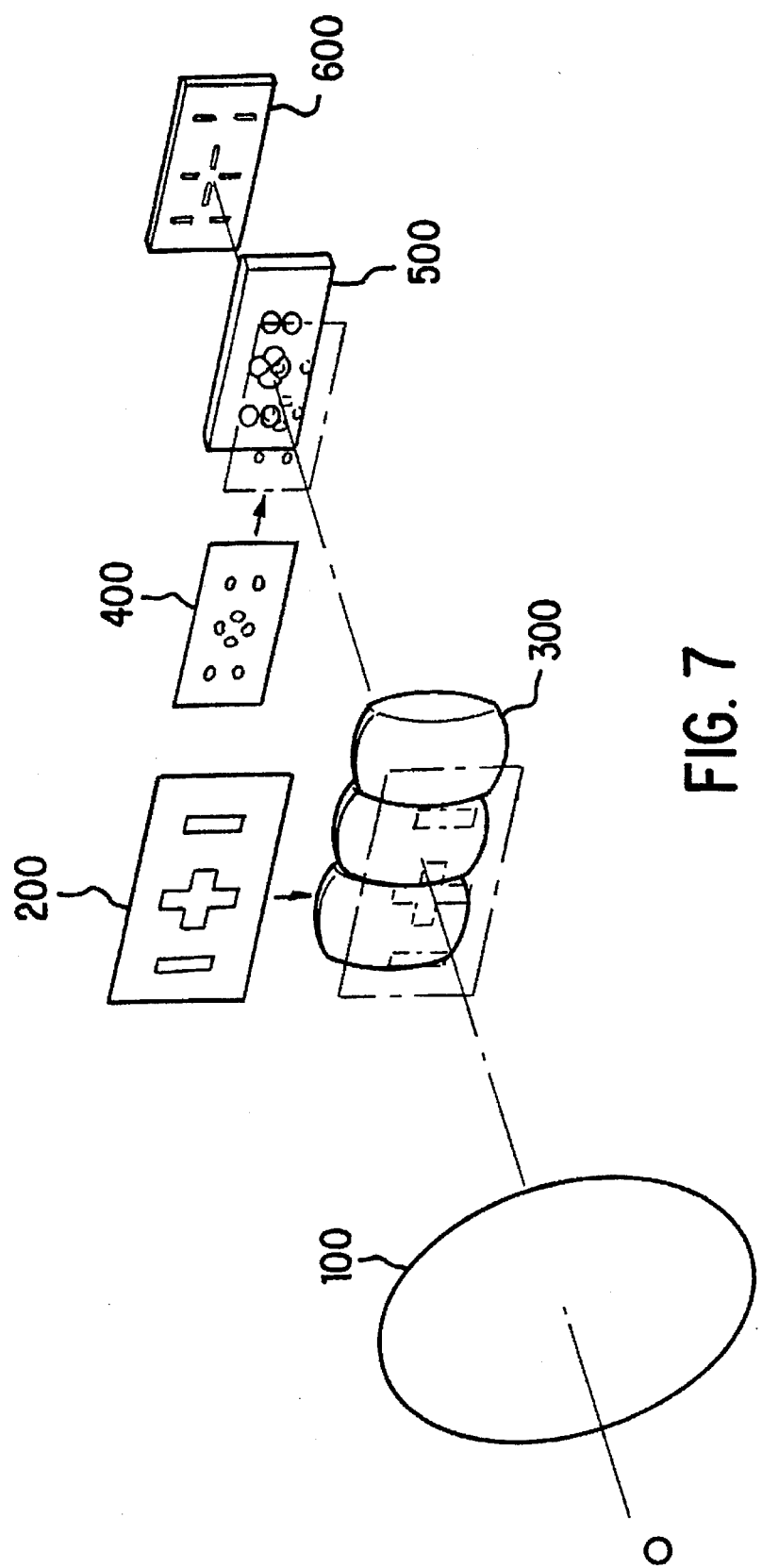
FIG. 7 is a drawing showing the entirety of the optical system in a focus state detection device according to a second embodiment of the present invention.

FIG. 7 is a drawing showing the entirety of the optical system in a focus state detection device of the second embodiment. The optical system of this focus state detection device has a field mask 200, a condenser lens 300, a diaphragm mask 400, a re-imaging lens 500 and a photoelectric conversion device 600 arranged in order on an optical axis O of a shooting lens 100.

As in the first embodiment, the focus state detection device of the second embodiment has a photoelectric conversion device in the horizontal direction and a photoelectric conversion device in the vertical direction. The optical systems of this photoelectric conversion device in the horizontal direction and photoelectric conversion device in the vertical direction are all positioned on the optical axis O of the shooting lens 100. Furthermore, in the second embodiment, optical systems having photoelectric conversion devices 600 positioned so as to be symmetric with respect to the optical axis O are positioned off of the optical axis O in the horizontal direction of the photographic field on both sides of the above-described optical systems positioned in the center.

Figure 8:
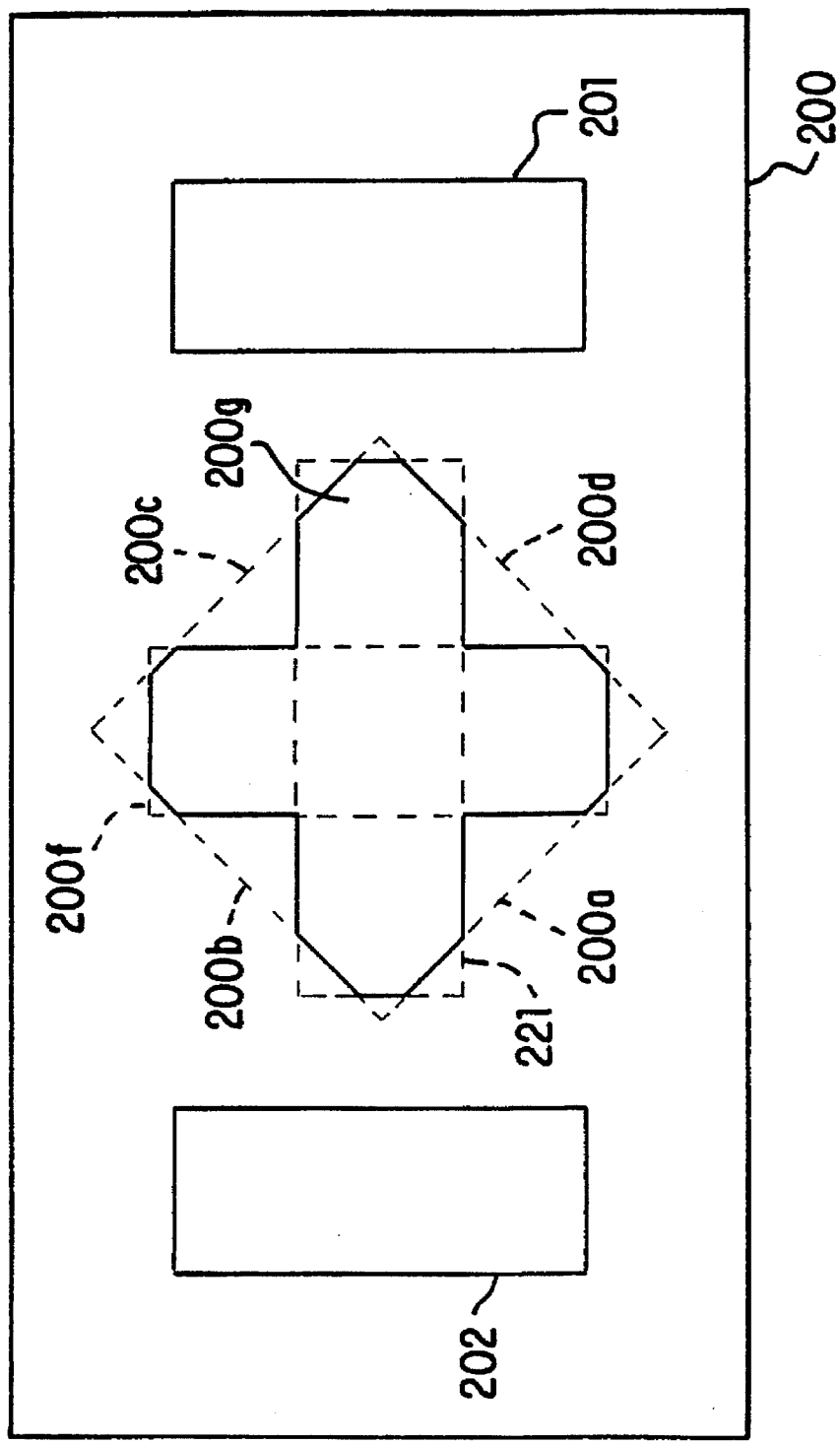
FIG. 8 is a drawing showing the field mask in a focus state detection device according to a second embodiment of the present invention.

FIG. 8 is a drawing illustrating field mask 200 in detail. As shown in FIG. 8, field mask 200 has aperture 200g, which has substantially the same shape as the aperture in the first embodiment, and two rectangular aperture areas 201 and 202 with the longer sides extending in the vertical direction.

Figure 9:
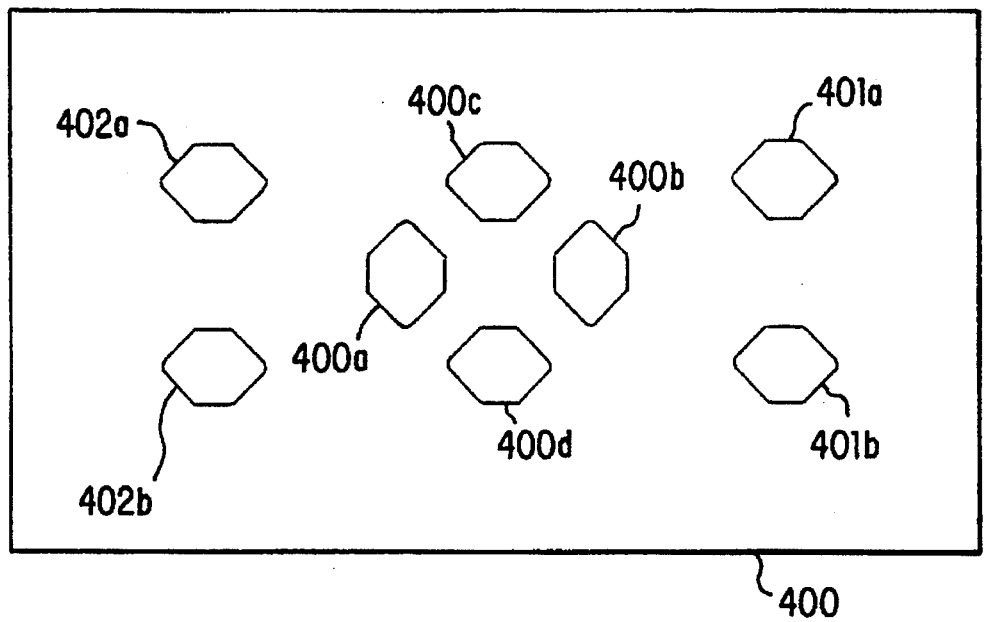
FIG. 9 is a drawing showing the diaphragm mask in a focus state detection device according to a second embodiment of the present invention.

FIG. 9 is a drawing illustrating diaphragm mask 400 in detail. As shown in FIG. 9, diaphragm mask 400 has apertures 400a, 400b, 400c and 400d through which light rays pass after passing through aperture 200g of field mask 200; apertures 401a and 401b through which light rays pass after passing through aperture 201 of field mask 200; and apertures 402a and 402b through which light rays pass after passing through aperture 202 of field mask 200. The shape of aperture 200g is substantially identical to the shape of aperture 2g of field mask 2 in the above-described first embodiment.

Figure 10:
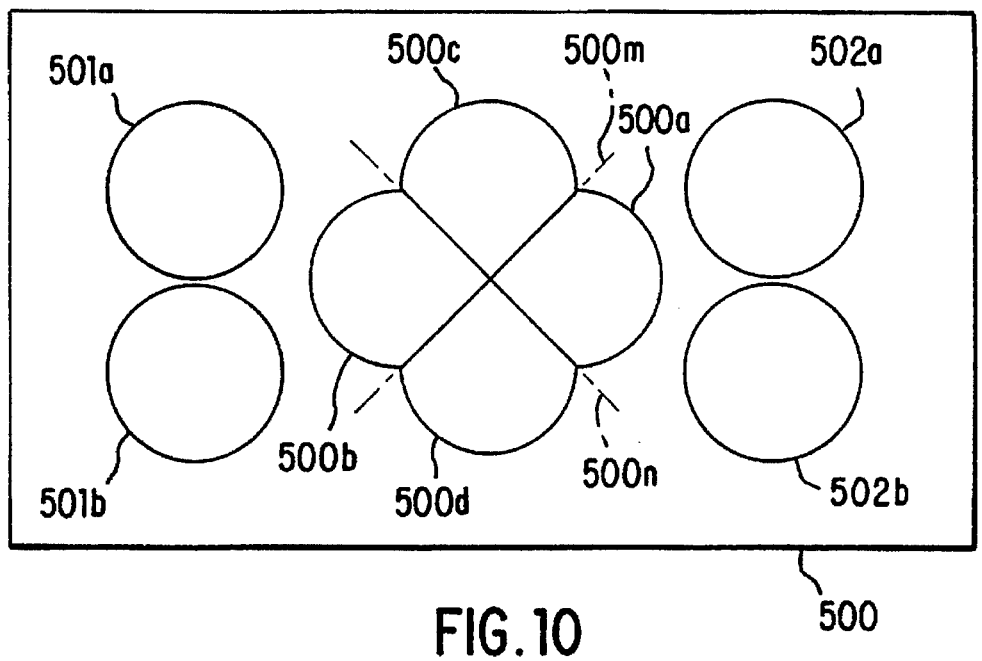
FIG. 10 is a drawing showing the re-imaging lens in a focus state detection device according to a second embodiment of the present invention.

FIG. 10 is a drawing illustrating re-imaging lens 500 in detail. As shown in FIG. 10, re-imaging lens 500 is composed of lens components 500a, 500b, 500c and 500d on which are incident light rays that have passed through apertures 400a, 400b, 400c and 400d of the diaphragm mask 400, respectively; lens components 501a and 501b on which are incident light rays that have passed through apertures 401a and 401b of diaphragm mask 400, respectively; and lens components 502a and 502b on which are incident light rays that have passed through apertures 402a and 402b of diaphragm mask 400, respectively. Lens components 500a, 500b, 500c and 500d are formed integrally as a single unit, and the various regions are separated by boundaries 500m and 500n.

FIGS. 11 to 14 are drawings showing a third embodiment of the present invention.

Figure 11:
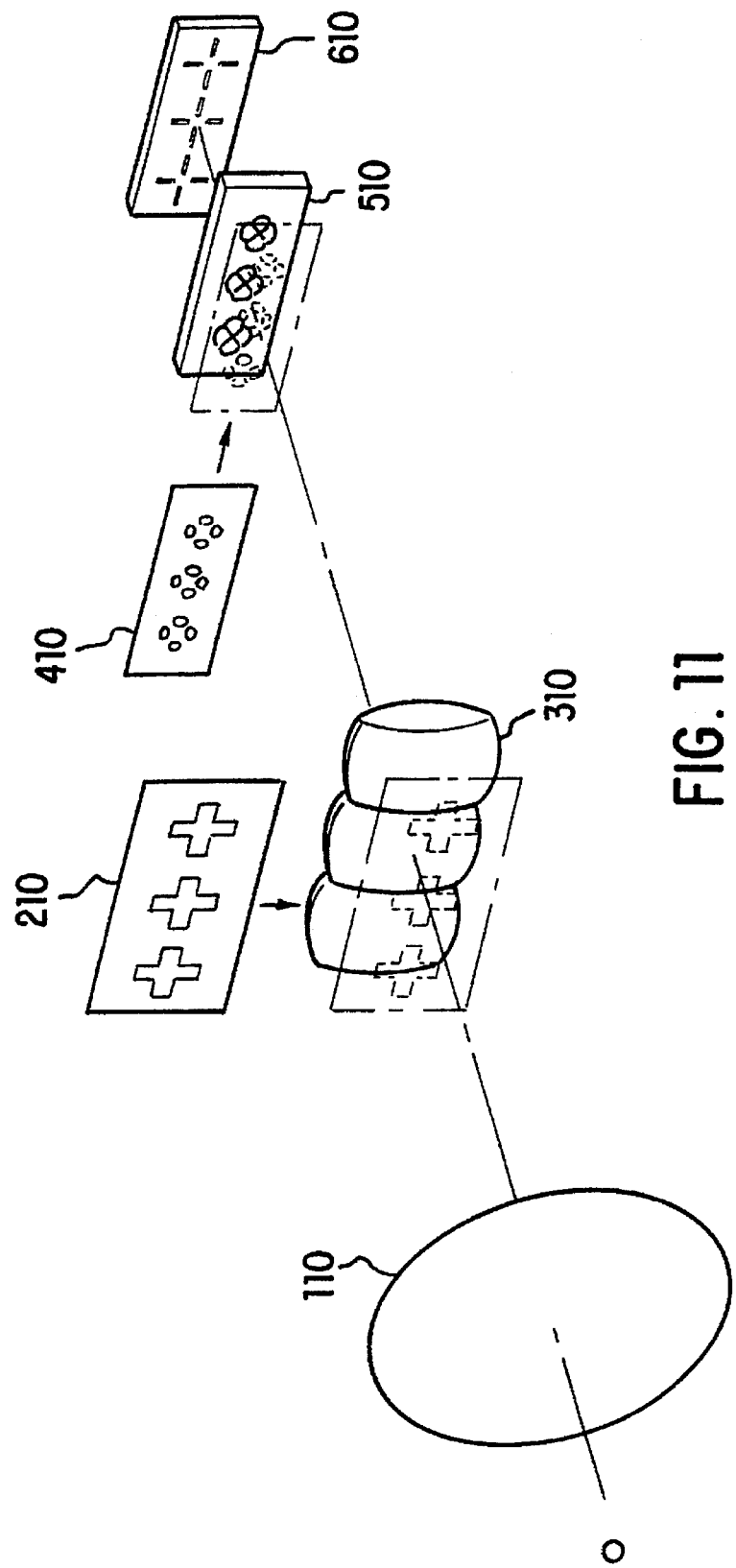
FIG. 11 is a drawing showing the entirety of the optical system in a focus state detection device according to a third embodiment of the present invention.

FIG. 11 is a drawing showing the entirety of the optical system in a focus state detection device of the third embodiment. The optical system of this focus state detection device has a field mask 210, a condenser lens 310, a diaphragm mask 410, a re-imaging lens 510 and a photoelectric conversion device 610 arranged in order on an optical axis O of a shooting lens 110.

The focus state detection device of the third embodiment has near the center a photoelectric conversion device in the horizontal direction and a photoelectric conversion device in the vertical direction similar to the first embodiment. The optical systems of the photoelectric conversion device in the horizontal direction and photoelectric conversion device in the vertical direction are all positioned on the optical axis O of the shooting lens 110. Furthermore, in the third embodiment, optical systems having photoelectric conversion devices 610 arranged in the vertical direction and the horizontal direction are positioned off of the optical axis O in the horizontal direction of the photographic field on both sides of the above-described optical systems positioned in the center so as to be symmetric with respect to the optical axis O.

Figure 12:
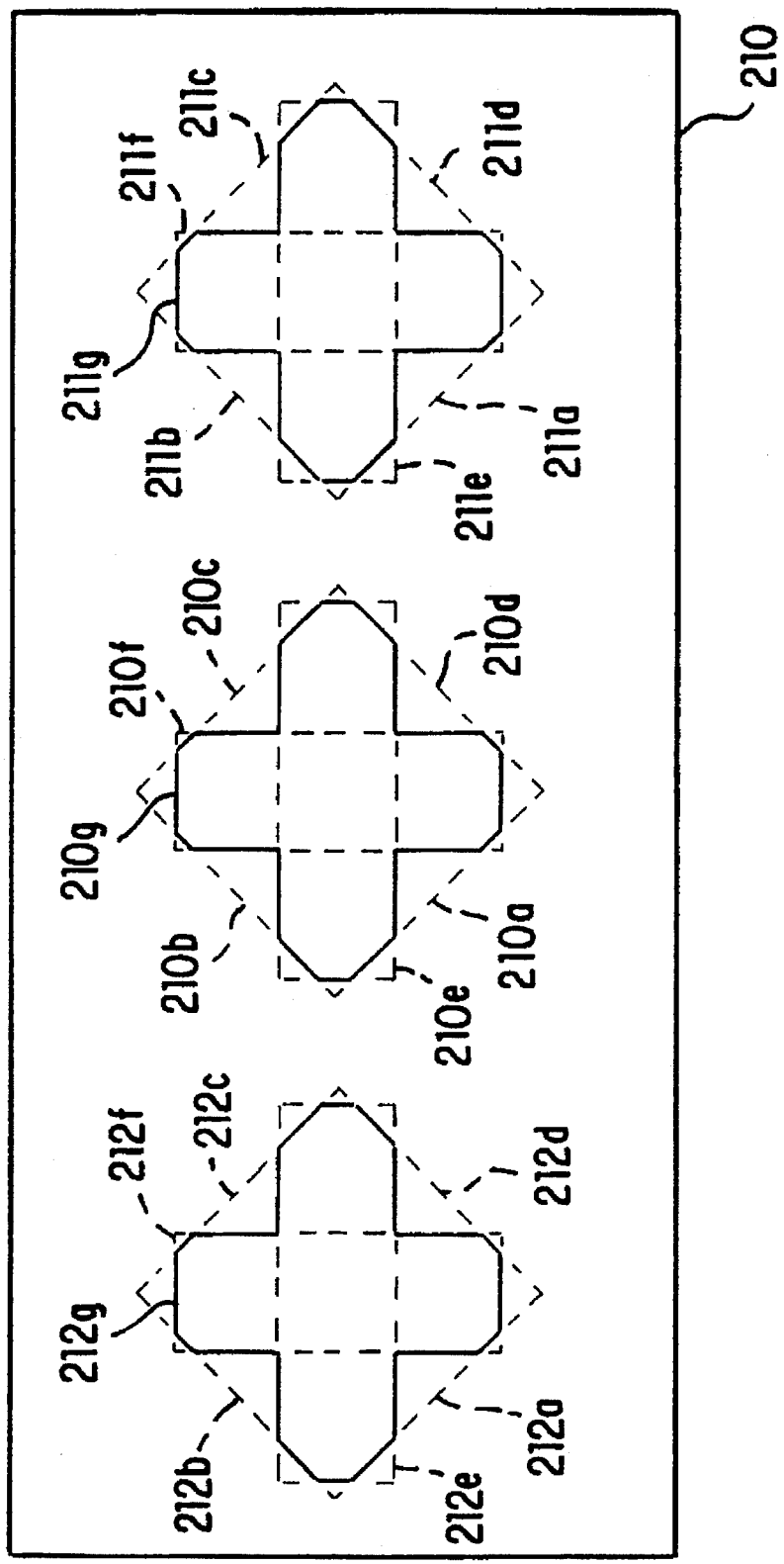
FIG. 12 is a drawing showing the field mask in a focus state detection device according to a third embodiment of the present invention.

FIG. 12 is a drawing illustrating field mask 210 in detail. As shown in FIG. 12, field mask 210 has apertures 210g, 211g and 212g that have substantially the same shape as the aperture in the first embodiment.

Figure 13:
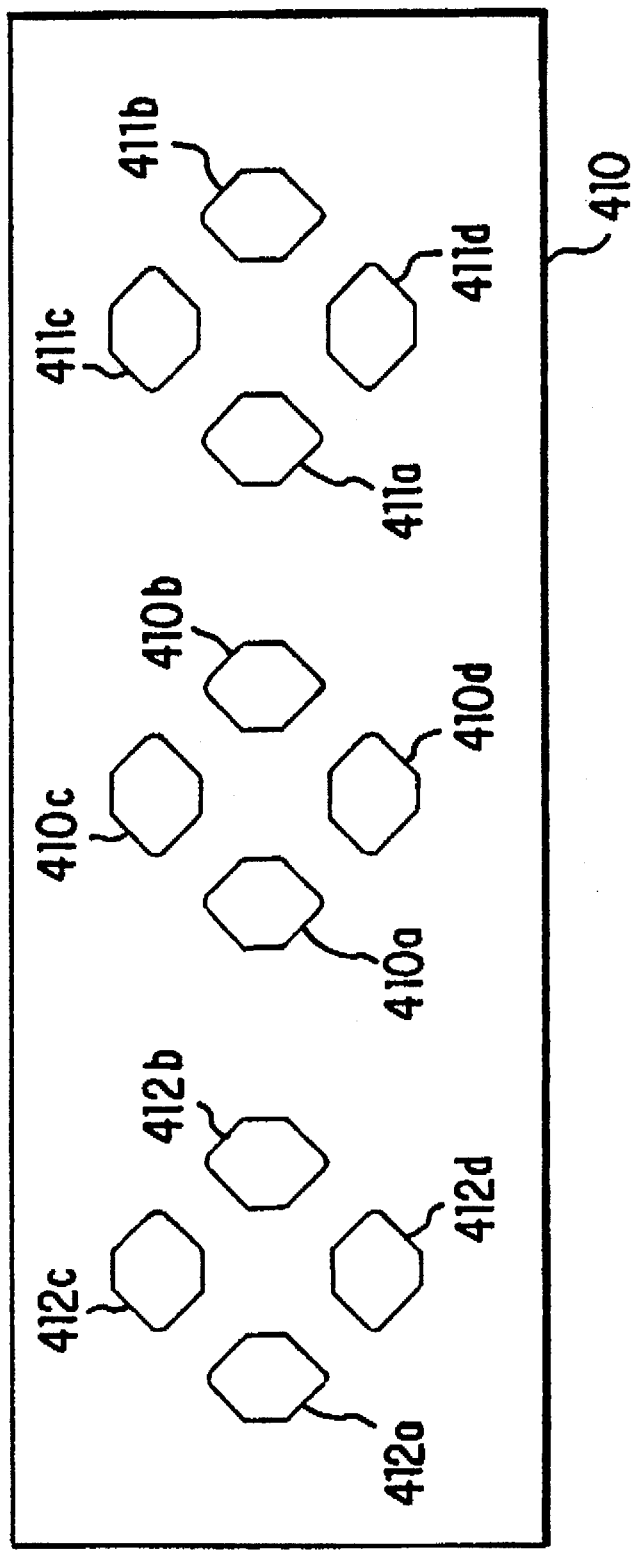
FIG. 13 is a drawing showing the diaphragm mask in a focus state detection device according to a third embodiment of the present invention.

FIG. 13 is a drawing illustrating diaphragm mask 410 in detail. As shown in FIG. 13, diaphragm mask 410 has apertures 410a, 410b, 410c and 410d, through which light rays pass that passed through aperture 210g of field mask 210; apertures 411a, 411b, 411c and 411d, through which light rays pass that have passed through aperture 211g of field mask 210; and apertures 412a, 412b, 412c and 412d through which light rays pass that have passed through aperture 212g of field mask 210. The shape of apertures 210g, 211g and 212g is the same as aperture 2g of field mask 2 in the above-described first embodiment.

Figure 14:
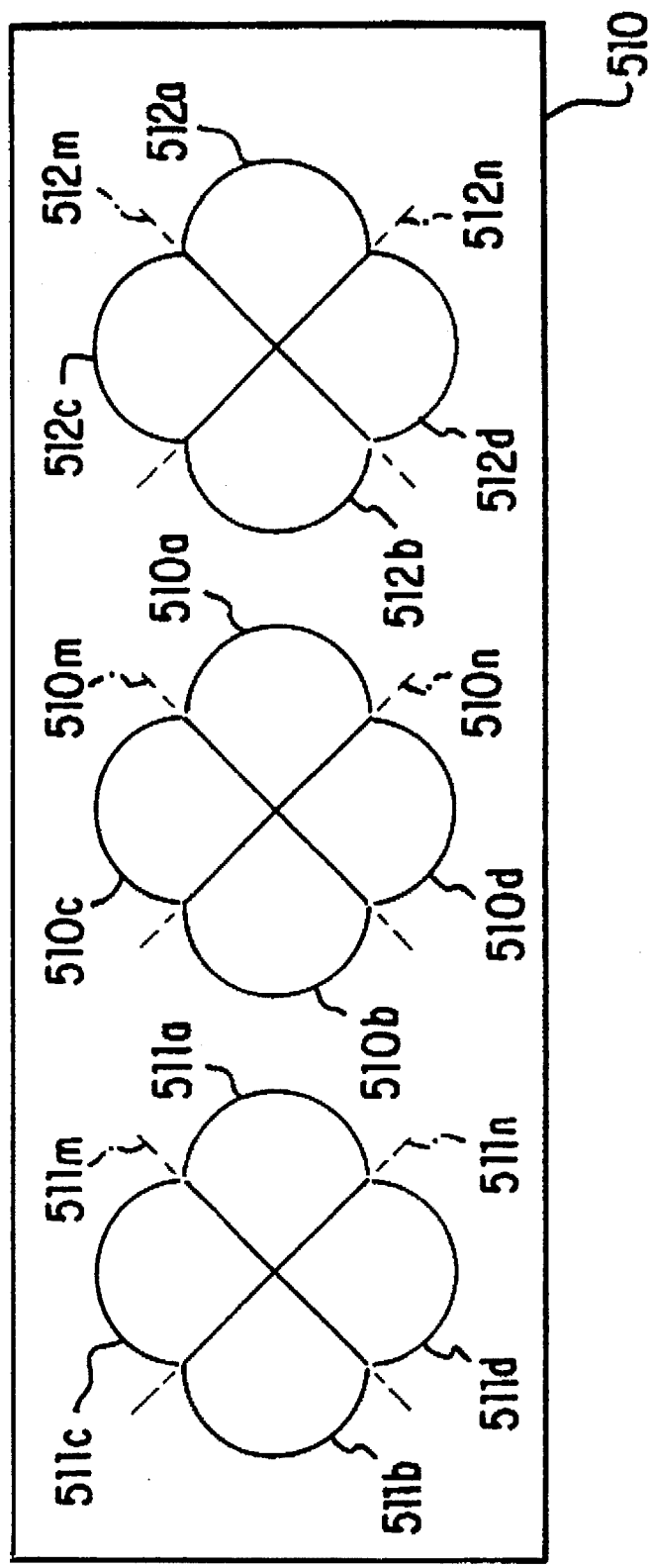
FIG. 14 is a drawing showing the re-imaging lens in a focus state detection device according to a third embodiment of the present invention.
Figure 15:
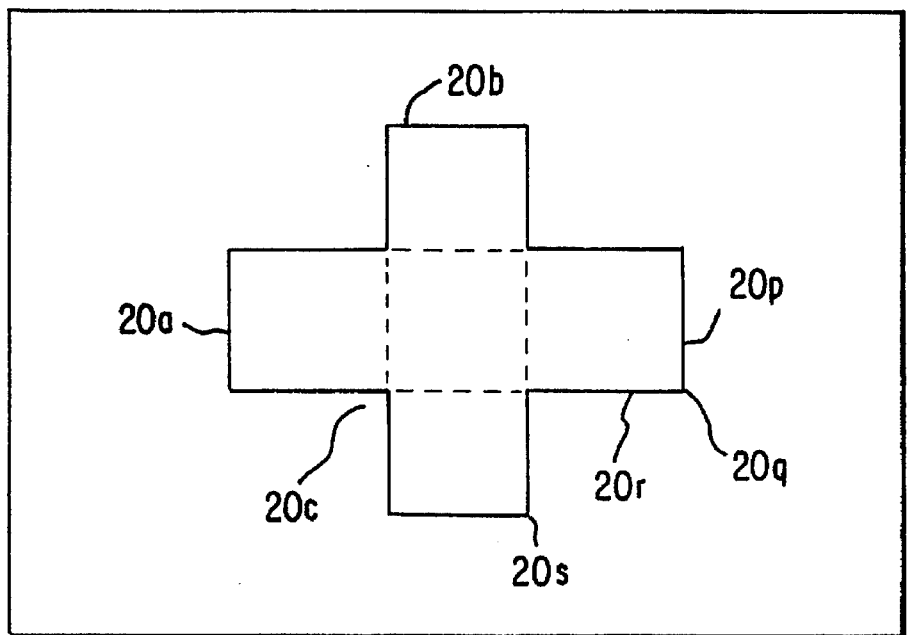
FIG. 15 is a drawing showing the mechanism that produces stray light in one type of conventional focus state detection device.
Figure 16:
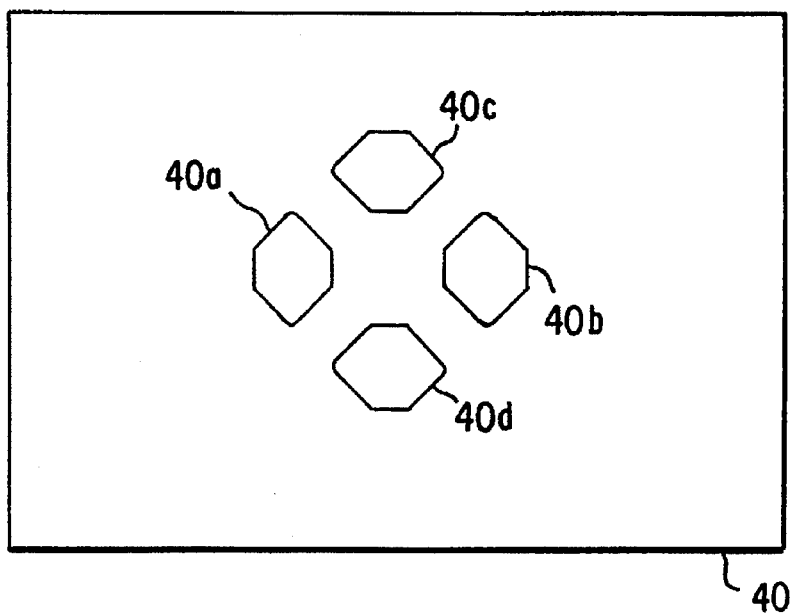
FIG. 16 is a drawing showing the mechanism that produces stray light in one type of conventional focus state detection device.
Figure 17:
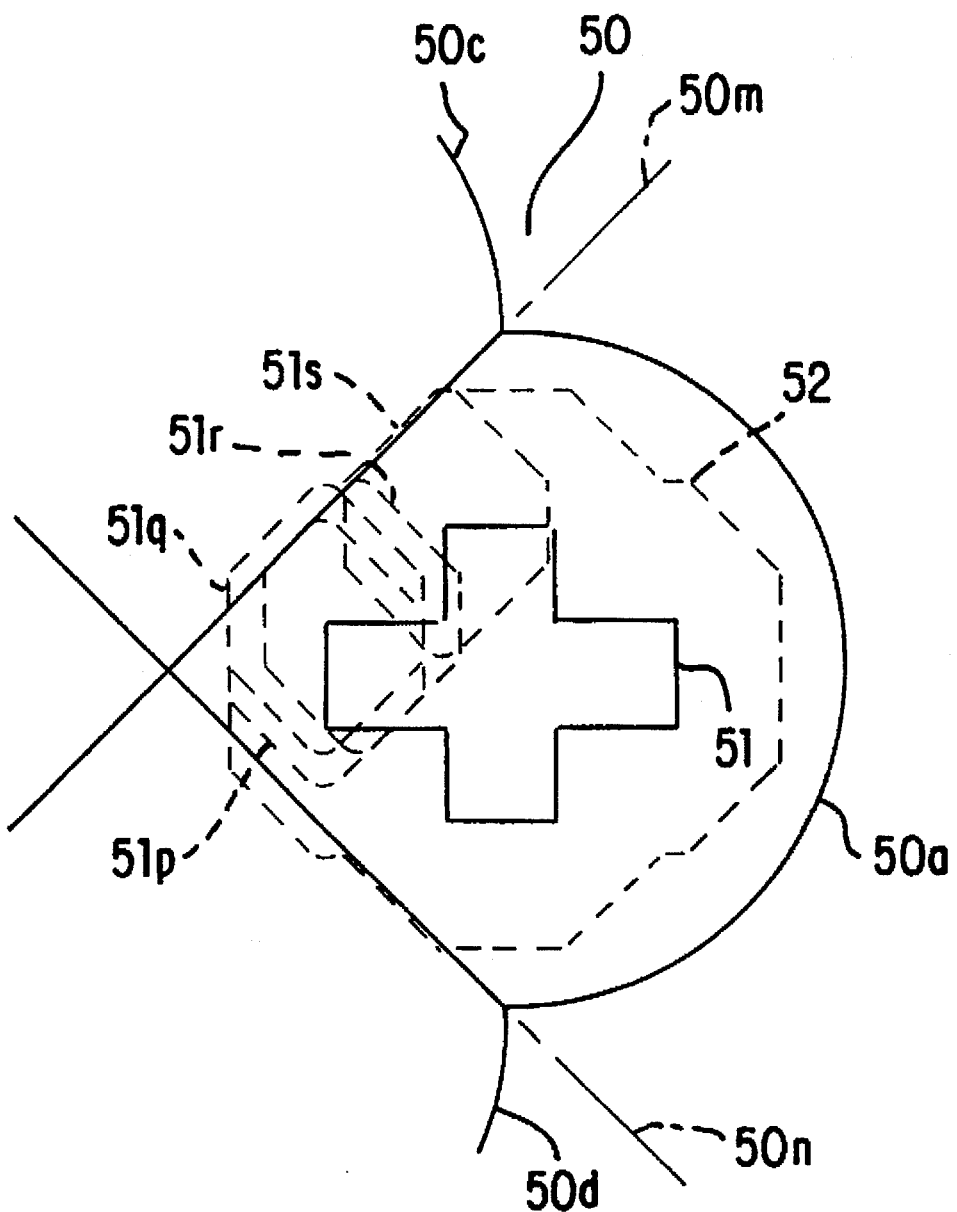
FIG. 17 is a drawing showing the mechanism that produces stray light in one type of conventional focus state detection device.
Figure 18:
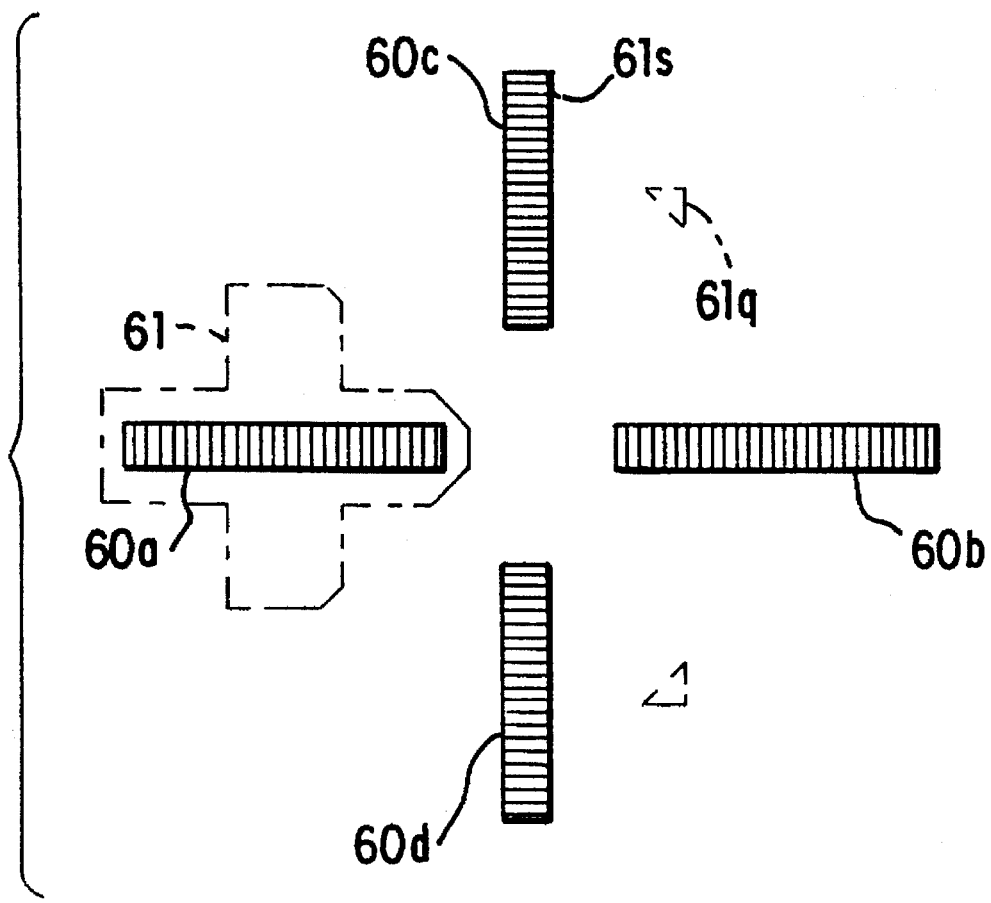
FIG. 18 is a drawing showing the mechanism that produces stray light in one type of conventional focus state detection device.
Figure 19:
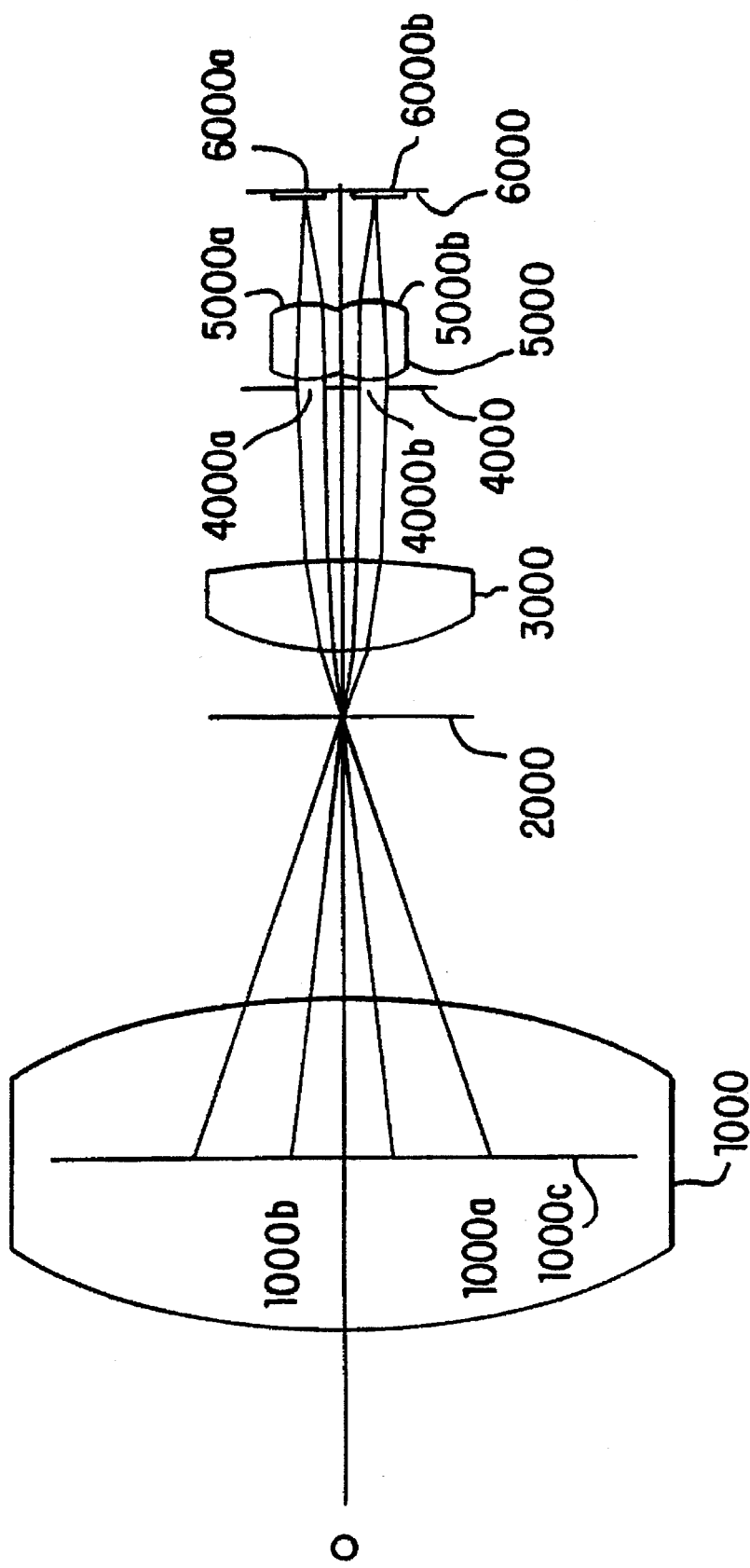
FIG. 19 is a drawing showing the optical system in one type of conventional focus state detection device.

FIG. 14 is a drawing illustrating re-imaging lens 510 in detail. Re-imaging lens 510 is composed of lens components 510a, 510b, 510c and 510d on which are incident light rays that have passed through apertures 410a, 410b, 410c and 410d of diaphragm mask 410, respectively; lens components 511a, 511b, 511c and 511d on which are incident light rays that have passed through apertures 411a, 411b, 411c and 411d of diaphragm mask 410, respectively; and lens components 512a, 512b, 512c and 512d on which are incident light rays that have passed through apertures 412a, 412b, 412c and 412d of diaphragm mask 410, respectively. Lens components 510a, 510b, 510c and 510d are formed integrally as a single unit, and the various regions are separated by boundaries 510m and 510n. Similarly, lens components 511a, 511b, 511c and 511d are formed integrally as a single unit, and the various regions are separated by boundaries 511m and 511n; and lens components 512a, 512b, 512c and 512d are formed integrally as a single unit, and the various regions are separated by boundaries 512m and 512n.

With the above three embodiments, the total length of each focus state detection optical system positioned on the optical axis and off of the optical axis of the shooting lens is the same, and each of the photoelectric conversion device arrays is configured on the same substrate. It would also be acceptable for the total length of each focus state detection optical system to vary, and for each photoelectric conversion device array to be configured on a different substrate.

In addition, the shape of the diaphragm mask aperture need not be limited to the shape employed in these embodiments, as this shape may be of various types including circular and elliptical.

According to the present invention, as described above, the field mask aperture is made into a shape substantially the same as the intersection of an area surrounded by a line segment corresponding to boundary lines on the side of a re-imaging lens toward the photoelectric conversion device arrays, and the rectangular areas corresponding to the reverse projected image of the photoelectric conversion device arrays of each focus state detection optical system in which focus state detection areas mutually intersect. These areas correspond to the outermost perimeter of the cross-section of light rays when light rays from each point in the conjugate image of the photoelectric conversion device arrays on the primary imaging plane move toward the pair of photoelectric conversion device arrays, respectively. By using this shape, the creation of stray light and internal reflection are suppressed in a focus state detection device having at least two focus state detection areas in mutually different directions, the areas intersecting, and it becomes possible to secure stable focus state detection precision.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the scope of the invention as defined in the following claims.

What is claimed is:

1. A focus state detection device comprising:
   at least two intersecting focus state detection areas;
   a shooting lens composing a subject image on a primary imaging plane;
   a field mask positioned adjacent the primary imaging plane having at least one centrally located aperture restricting light rays to photoelectric conversion devices; and
   a re-imaging optical system comprising:
      a diaphragm mask having at least four stops; and
      a re-imaging lens including at least four integrally formed lens portions,
   wherein the shape of said field mask aperture corresponds to the shape of an area formed by the intersection of (1) an area surrounded by line segments corresponding to boundary lines of the re-imaging lens and (2) rectangular areas corresponding to boundary lines of a reverse projected image of the photoelectric conversion devices.

2. A focus state detection device according to claim 1, wherein the at least two intersecting focus state detection areas are mutually orthogonal.

3. A focus state detection device according to claim 1, wherein at least two of said focus state detection areas intersect on an optical axis of the shooting lens.

4. A focus state detection device according to claim 1, wherein at least two of said focus state detection areas intersect off an optical axis of the shooting lens.

5. A focus state detection device according to claim 4, wherein said field mask further comprises three substantially identically shaped apertures.

6. A focus state detection device according to claim 5, wherein the first of said three substantially identically shaped apertures is the centrally located aperture located on the optical axis and the second and third of said apertures are offset horizontally on opposite sides of said first aperture.

7. A focus state detection device according to claim 1, wherein a plurality of combinations of at least two of said focus state detection areas are positioned on and off an optical axis of the shooting lens.

8. A focus state detection device according to claim 1, wherein said field mask further comprises two rectangular apertures offset horizontally from said central aperture and having longer sides extending in a vertical direction.

9. A focus state detection device according to claim 8, wherein said re-imaging lens includes three lens components, a first of said lens components being centrally disposed on said optical axis, a second of said lens components being horizontally offset to one side of said optical axis, and a third of said lens components being horizontally offset to the other side of said optical axis.

10. A focus state detection device according to claim 9, wherein said second lens component has at least two lens portions and said third lens component has at least two lens portions.

11. A focus state detection device according to claim 1, wherein said re-imaging lens includes four lens components formed integrally as a single unit.

12. A focus state detection device comprising:
    at least two intersecting focus state detection areas;
    means for composing a subject image on a primary imaging plane;
    means for restricting light rays to pairs of photoelectric conversion devices adjacent the primary imaging plane; and
    a re-imaging optical system comprising:
       a diaphragm mask having at least two pairs of stops; and
       a re-imaging lens including at least two pairs of lens portions formed integrally,
    wherein the means for restricting light rays includes means for suppressing internal reflection and stray light.

13. The focus state detection device according to claim 12, wherein said suppressing means comprises a centrally disposed aperture in said restricting means, a shape of said aperture corresponding to the shape of an area formed by the intersection of (1) an area surrounded by line segments corresponding to boundary lines of the re-imaging lens and (2) rectangular areas corresponding to the boundary lines of a reverse projected image of the photoelectric conversion devices.

14. A focus state detection device according to claim 12, wherein the at least two intersecting focus state detection areas are mutually orthogonal.

15. A focus state detection device according to claim 12, wherein at least two of said focus state detection areas intersect on an optical axis of the shooting lens.

16. A focus state detection device according to claim 12, wherein at least two of said focus state detection areas intersect off an optical axis of the shooting lens.

17. A focus state detection device according to claim 16, wherein said means for restricting light rays further includes three substantially identically shaped apertures.

18. A focus state detection device according to claim 17, wherein the first of said three substantially identically shaped apertures is the centrally located aperture located on the optical axis and a second and third of said apertures are offset horizontally on opposite sides of said aperture.

19. A focus state detection device according to claim 12, wherein a plurality of combinations of at least two of said focus state detection areas are positioned on and off an optical axis of the shooting lens.

20. A focus state detection device according to claim 12, wherein said means for restricting light rays further comprises two rectangular apertures offset horizontally from said central aperture and having long sides extending in a vertical direction.

21. A focus state detection device according to claim 20, wherein said re-imaging lens includes three lens components a first of said lens components being centrally disposed on said optical axis, and a second of said lens components being horizontally offset to one side of said optical axis and a third of said lens components being horizontally offset to the other side of said optical axis.

22. A focus state detection device according to claim 21, wherein said second lens component has at least a pair of lens portions and said third lens component has at least a pair of lens portions.

23. A focus state detection device according to claim 12, wherein said re-imaging lens includes four lens components formed integrally as a single unit.

24. A focus state detection method comprising:

composing a subject image on a primary imaging plane;

positioning a field mask adjacent the primary imaging plane;

restricting light rays to at least a pair of photoelectric conversion devices; and providing a re-imaging optical system comprising a diaphragm mask having at least two pairs of stops and a re-imaging lens including at least two pairs of lens portions formed integrally, wherein the restricting step includes suppressing internal reflection and stray light by providing at least one shaped aperture in the field mask.

25. A focus state detection method according to claim 24, wherein said restricting step further comprises restricting light rays to the at least two intersecting focus state detection areas that are mutually orthogonal.

26. A focus state detection method according to claim 25, wherein said providing step further comprises providing a re-imaging lens including four lens components formed integrally as a single unit.

27. A focus state detection method according to claim 24, wherein said restricting step further comprises restricting light rays to at least two of said focus state detection areas intersecting on an optical axis of the shooting lens.

28. A focus state detection method according to claim 24, wherein said restricting step further comprises restricting light rays to at least two of said focus state detection areas intersecting off an optical axis of the shooting lens.

29. A focus state detection method according to claim 28, wherein said positioning step further comprises providing a field mask having three substantially identically shaped apertures.

30. A focus state detection method according to claim 29, wherein a first of said three substantially identically shaped apertures is located on the optical axis and a second and third of said apertures are offset horizontally on opposite sides of said aperture.

31. A focus state detection device according to claim 30, wherein said second lens component has at least a pair of lens portions and said third lens components has at least a pair of lens portions.

32. A focus state detection method according to claim 21, wherein said restricting step further comprises restricting light rays to a plurality of combinations of at least two said focus state detection areas, said method comprising positioning said combinations on and off an optical axis of the shooting lens.

33. A focus state detection method according to claim 24, wherein said positioning step further comprises providing a field mask having two rectangular apertures offset horizontally from a central aperture, said rectangular apertures having long sides extending in a vertical direction.

34. A focus state detection method according to claim 33, wherein said providing step further comprises providing a re-imaging lens including three lens components, a first of said lens components being centrally disposed on said optical axis, a second set of lens components being horizontally offset to one side of said optical axis and a third set of lens components horizontally offset to the other side from an integral central lens including four lens components.

* * * * *